United States Patent [19]

Chen et al.

[11] 4,197,214
[45] Apr. 8, 1980

[54] CRYSTALLINE ZEOLITE CATALYSTS OF CHEMICAL REACTIONS

[75] Inventors: Nai Y. Chen, Titusville, N.J.; William J. Reagan, Yardley, Pa.; Vern W. Weekman, Jr., Cherry Hill, N.J.

[73] Assignee: Mobil Oil Corporation, New York, N.Y.

[21] Appl. No.: 949,703

[22] Filed: Oct. 10, 1978

[51] Int. Cl.² .................... B01J 29/38; C10G 35/06; C07C 15/00
[52] U.S. Cl. ................................. 252/416; 208/135; 252/412; 585/407
[58] Field of Search ................ 252/416, 455 Z; 208/135; 260/668 R, 681–682

[56] References Cited

U.S. PATENT DOCUMENTS

| | | | |
|---|---|---|---|
| 3,894,104 | 7/1975 | Chang et al. | 260/682 |
| 4,090,949 | 5/1978 | Owen et al. | 260/668 R |
| 4,128,504 | 12/1978 | Plank et al. | 252/455 Z |

*Primary Examiner*—P. E. Konopka
*Attorney, Agent, or Firm*—Charles A. Huggett; Carl D. Farnsworth

[57] ABSTRACT

Crystalline zeolite catalysts are stabilized against reducing and moisture containing atmospheres by providing and maintaining substantial metal cationic sites in the zeolite during use in chemical reactions encountering reducing and/or moisture rich atmospheres at high temperature.

11 Claims, No Drawings

CRYSTALLINE ZEOLITE CATALYSTS OF CHEMICAL REACTIONS

BACKGROUND OF THE INVENTION

It is known to carry out chemical reaction comprising reducing and oxidizing atmospheres either with or without the presence of a moisture rich atmosphere at high temperatures in the range of 500° to 1500° F. in the presence of crystalline zeolite catalyst with and without added metal components. For example, zeolite catalysts or crystalline aluminosilicates have been employed in a wide variety of reactions comprising, cracking, isomerization, aromatization, hydrocracking, alkylation, syngas conversion and the conversion of lower alcohols to olefins and/or hydrocarbon products in the gasoline boiling range and aromatic rich products. Hydrodewaxing operations which are a selective cracking of long chain paraffins and disproportionation reaction to form BTX have also been pursued in the presence of crystalline zeolites.

The formation of aromatic compounds from low molecular weight hydrocarbons, including paraffins, olefins and mixtures thereof is taught, for example, in U.S. Pat. Nos. 3,296,324 and 3,374,281. U.S. Pat. No. 3,331,767 discloses using a zinc containing crystalline zeolite that has been combined with another metal such as platinum, nickel or cobalt for effecting hydrocracking with a small pore zeolite such as erionite. This patent teaches that the original cation of a zeolite may be replaced with zinc or with a hydrogenation component such as nickel. Some other U.S. Pat. Nos. of interest include: 3,140,249, 3,140,251, 3,140,253 and 3,140,322. U.S. Pat. No. 3,700,585 discloses using a crystalline zeolite of selected pore dimensions associated with a variety of cations including hydrogen, ammonium and metal cations. The metal cation may be incorporated by a typical ion exchange technique known in the art wherein the zeolite is contacted with the salt of the desired replacing cation or cations. Representative ion exchange techniques are disclosed in U.S. Pat. Nos. 3,140,249, 3,140,251 and 3,140,253 mentioned above. Following contact with the salt solution of the desired replacing cation, the zeolites are then preferably washed with water and dried at a temperature ranging from 150° F. up to about 500° F. Thereafter, the dried material is calcined in air, in an inert gas or a mixture thereof at a temperature within the range of 500° F. to 1500° F. for a period of time within the range of 1 to 48 hours or more.

It will be recognized by those skilled in the art that the crystalline zeolite, both natural and synthetically formed, becomes catalytically active when original cationic sites of sodium, calcium, potassium, etc., are exchanged with metal ions, ammonium ions, hydrogen ions and mixtures thereof and converted to the cationic form. Such exchange technique may be used with any of the crystalline zeolites herein identified to change the zeolite to a catalytic active form providing an alpha ($\alpha$) activity greater than 10 and preferably at least 20 alpha activity.

SUMMARY OF THE INVENTION

This invention is concerned with stabilizing crystalline zeolites of high alpha activity greater than about 10. Such catalysts are known in the prior art and are used in reducing atmospheres and aged by contact at relatively high temperatures with steam. More particularly, the present invention is concerned with modifying catalytically active crystalline zeolites including particularly a special class of crystalline zeolites represented by ZSM-5, ZSM-11, ZSM-12, ZSM-38 and ZSM-35, characterized by criteria including a silica-to-alumina ratio greater than 12 and a constraint index within the range of 1 to 12. Other larger and smaller pore crystalline zeolites may also be stabilized by the method of this invention and include faujasite, mordenite and erionite crystalline zeolites.

In accordance with one aspect of this invention, it has been found that ion exchanged crystalline zeolites are more stable to high temperature and moisture when frequently subjected to an oxidizing atmosphere under conditions selected to maintain cationic sites in the crystal structure. That is, when exchanged metal ions are incorporated in the zeolites as herein identified and the exchanged metals are converted and retained in their cationic state by frequent exposure to an oxidative atmosphere, then the zeolite is found to maintain extended high activity in an adverse process environment, i.e., a reducing atmosphere at high temperature with and without the presence of steam.

In accordance with this invention, after the zeolite is prepared to comprise metal cationic sites as above identified and contacted in a reducing atmosphere under conditions to be reduced by that atmosphere to not more than its zero valence single atom state, it has been found that the zeolite can then be restored to its cationic form, by exposure to an oxidizing atmosphere under selected conditions. This oxidizing operation restores or transforms the zeolite when reduced to near its zero valence single atom state, to its metal cationic state. Thus, the well-known redox reaction phenomenon is maintained to reverse the zeolite to its cationic state desired. However, if the zeolite catalyst is kept in a reducing atmosphere for an extended period of time sufficient to reduce its metal cation so that the reduced metal atoms migrate and agglomerate on available surfaces to form metal clusters, then pursuing and effecting the redox reaction phenomenon as above recited is not accomplished. Once the metal cluster is formed, the redox reaction, or reoxidation and distribution of the metal in the zeolite in the cationic form is quite difficult, if not impossible. Thus, to distinguish the "zero valent state of single metal atoms" from "zero valent metal clusters", it is to be remembered that the "zero valent metal clusters" are substantially irreversible and the above defined "zero valent state of single metal atoms" is a reversible state. In addition, when the metal clusters are formed, acid activity is derived from protonic sites left by the metal cations. These protonic sites are less steam stable than that of the initially formed cationic zeolite catalyst. Thus, as long as there is no steam atmosphere about this zeolite, the zeolite containing metal clusters can have some activity. However, when a steam atmosphere is present, such as is formed in the conversion of methanol to gasoline, the reduced zeolite comprising metal clusters is irreversibly reduced in catalyst activity. Also, when a metal cluster containing zeolite catalyst is oxygen regenerated, the steam produced during this oxidation regeneration also will effectively reduce the catalyst activity to the irreversible state above identified.

In a processing environment where high temperature steam is encountered, it is essential that one decrease the time of exposure of a high activity zeolite catalyst comprising cationic sites to a reducing atmosphere to less than that required to reduce and form metal clusters and preferably the exposure should not go beyond the time to reduce the metal cation to approaching incipient zero valent single atom state. It will be understood by those skilled in the art that the time for such changes in the zeolite catalyst form will vary considerably with the chemical reaction being performed, the temperature of the reaction, and the activity of the catalysts employed in such chemical reactions. For example, the reactions of methanol conversion and syngas conversion are to be distinguished from less active catalyst reactions such as cracking and hydrocracking wherein the alpha activity of the catalyst is normally far below 10 alpha and, more usually, about 1 alpha (46 FAI) activity.

The concepts contributing to this invention deal with a combination of catalyst formulations and reaction surveillance in which used, so that reactions involving the conversion of lower alcohols to hydrocarbons pursued at elevated temperatures are feasible for extended operating catalyst cycles.

It has been observed that hydrogen zeolites derive their catalytic acid activity from protons associated with framework aluminum sites. In the presence of steam at relatively high temperatures, the protonic sites undergo hydrolysis reactions resulting in the expulsion of aluminum from the crystal lattice. This phenomenon is known as dealuminization or dealumination. This loss of framework aluminum is accompanied by the loss of the associated protons and thus catalytic activity. The results of this hydrolysis reaction is irreversible and, therefore, the lost catalytic activity cannot be recovered by either hydrogenative or oxidative regeneration. The rate of the hydrolysis reaction is temperature dependent. For example, at temperatures below about 800° F., the reaction rate is quite slow; however, at higher temperatures, particularly above about 900° F., it is fast enough to affect long-term stability of the zeolite catalyst.

Studies directed at stabilizing a crystalline zeolite (crystalline aluminosilicate) and protecting it from hydrolysis reactions in the presence of high temperature steam have identified a number of divalent cations which, when properly exchanged into the zeolite structure, will protect the associated aluminum sites of the zeolite from dealumination and at the same time will retain sufficient catalytic activity for effecting reactions in and comprising a reducing atmosphere. Cations suitable for effecting the above protective association are found to comprise metals of Groups IB, IIB and VIII of the Periodic Table. These include copper, silver, zinc and cadmium and all of the elements of Group VIII except cobalt. Particularly effective cations for the purpose include zinc, copper and combinations of zinc and copper or zinc and palladium.

In order to fulfill the concepts of this invention, it is important that the metal ion be properly exchanged in the zeolite since when the exchanged metal is in the cationic state and retained as such, the zeolite catalyst remains stable in a reducing atmosphere, in the presence of reaction temperature steam and in combinations thereof. Introducing the metal by impregnation does not work particularly well since impregnating with the metal oxide does not provide the required cationic sites or a desired distribution thereof. Furthermore, it is quite difficult to change the metal oxide to the cationic form and the substantially less than desired distribution of the formed cations is much less satisfactory than obtained by the exchange technique to provide well distributed cationic sites. On the other hand, zero valent metal atoms as distinguished from metal oxides and metal clusters are easily oxidized to the cationic form. In addition, it has been found that when zinc is used as a metal in the zeolite structure that it leaves the crystal structure when retained in a prolonged reducing atmosphere at an elevated temperature but is retained in the structure when maintained substantially in the cationic form. It has also been observed that for some chemical reactions, a desired catalyst selectivity requires reducing the impregnated metal ion to provide substantially zero valence. However, reducing to the state of zero valence sufficient to initiate metal migration will cause the reduced metal to separate from the zeolite and/or agglomerate on an available surface so that the catalyst is reduced to a relatively inactive state.

The concepts of this invention are particularly concerned with the use of high activity crystalline zeolites of at least 10 alpha and the preparation of such catalysts having desired activity and selectivity for promoting particular chemical reactions in a reducing atmosphere with and without added or formed moisture. The invention is also directed particularly to the preparation of and use of zeolite conversion catalysts containing exchanged metal cationic sites and the operating techniques relied upon to minimize undesired reduction of the zeolite cationic site during the completion of chemical reactions encountering moisture and hydrocarbons or other materials providing a reducing atmosphere.

In a process for cracking hydrocarbons and converting methanol to gasoline, hydrocarbons and steam are encountered at an elevated temperature. Hydrocarbons are strong reducing agents and steam hydrolyzes the catalyst as defined above. Since hydrocarbons are strong reducing agents, the conversion thereof or the formation thereof provides an environment which is hostile to the herein identified metal cation zeolite catalysts. A metal cation stabilized crystalline zeolite is rapidly changed in such an environment as above identified and can be deactivated to an irreversible condition unless suitable precautions are taken to avoid obtaining such a condition. The concepts of this invention include methods to overcome the herein identified irreversible deactivation of the catalyst by the atmosphere in which used and, more importantly, improve stability of a high activity zeolite catalyst composition used in a reducing atmosphere and/or steam at an elevated temperature.

In accordance with the operating concepts of this invention, a crystalline zeolite conversion catalyst containing exchanged metal cationic sites is retained in an elevated temperature chemical reaction comprising a reducing atmosphere with or without formed or added moisture such as steam for a time period less than that required to reduce a portion of the metal cations beyond a given state and to a valence state permitting metal migration or the formation of metal clusters. The active zeolite catalyst used is separated from the reducing atmosphere following a predetermined exposure time not to exceed reducing the catalyst to the irreversible state herein defined and thereafter the catalyst composition is reoxidized to re-establish the metal cationic sites as per the redox reaction phenomenon and before further use thereof in a reducing atmosphere. Oxidizing the catalyst to maintain desired metal cationic sites may be accomplished at a temperature within the range of 750° to 1350° F. and a contact time within the range of 10 seconds to 10 minutes.

It will be recognized by those skilled in the art and in view of the above-explained concepts, that the steam stability of the catalyst is particularly retained by limiting a significant reduction of the formed zeolite with cationic sites. Thus, depending upon the severity of the reducing atmosphere in which employed, the catalyst may be retained in the reaction zone for a time period commensurate with retaining substantial cationic sites or at least restricting reduction of a significant number of metal ions to a zero valence state. Thus, depending upon the severity of reaction performed and its reducing atmosphere, the reaction on stream time may be less than one second or one or more seconds such as several seconds may be acceptable before interrupting the operation to re-establishing cationic sites by oxidation. It is contemplated using reaction times in the reducing atmosphere where little or no steam is present for longer on stream times than where steam is present. Thus, the reaction time may be equal to one or more seconds or it may be less than one second.

In converting methanol to gasoline, it is generally preferred to conduct the reaction at a temperature above about 700° F. and up to about 1100° F., more usually, a temperature above 900° F. is preferred. The advantages of operating at the higher temperature include:

(1) the size of the reactor required is smaller and, therefore, less catalyst is needed, (2) the product distribution is improved by providing more gasoline boiling range product and less undesired high molecular weight aromatics, and (3) the thermal efficiency of the process is higher when the exothermic reaction is maintained at a high temperature where the reaction heat can be recovered more efficiently.

DISCUSSION OF SPECIFIC EXAMPLES

To demonstrate that increased steam stability is possible when metal ions are exchanged into a zeolite framework, the following catalysts were prepared and tested:

Catalyst A was a 100% $NH_4$ exchanged ZSM-5 crystalline zeolite, air calcined at a rate of 1° C./min. to 540° C. (1004° F.) and held at 540° C. for 10 hours.

Catalyst B, a $NH_4$ exchanged ZSM-5 crystalline zeolite extrudate containing 35% alumina was calcined in the same manner as Catalyst A.

Catalyst C was prepared by wet impregnation of 2% Zn as a $ZnCl_2$ solution in $NH_4$ exchanged ZSM-5 crystalline zeolite containing no binder at room temperature, dried 16 hours at 120° C. (248° F.), air calcined 1° C./minute to 540° C. and held for 10 hours at 540° C. (1004° F.). Ion exchange took place.

Catalyst D was prepared by the same procedure as Catalyst C except 1% Zn and 1% Cu, both as chloride solutions were used. Ion exchange took place in both cases.

Catalyst E, 1.2% ZnO and an $NH_4$ exchanged ZSM-5 crystalline zeolite extrudate containing 35% alumina were dry ball milled for 5 hours, pelleted and air calcined as above. No ion exchange took place in the dry physical mixture.

Catalyst F was prepared in the same way as Catalyst D by wet impregnation, except that an $NH_4$ exchanged ZSM-5/$Al_2O_3$ extrudate was used instead of the zeolite powder. The alumina binder soaked up the metal chloride solution, so very little, if any, ion exchange took place with the zeolite.

The six catalysts, A through F, prepared as above defined, were tested for their aromatization activity before and after a steam treatment. The steam treatment consisted of treating the catalyst with 1 atm. steam at 1000° F. for 8 hours. n-Hexane was the feed used in the aromatization test. The test was made at 1 WHSV and 1050° F. and the results are shown in Table 1.

Table 1

| | | Test Results | | |
|---|---|---|---|---|
| | | Wt. % Aromatics Yield | | % Loss in Aromatics Yield |
| | Catalyst | Fresh | After Steaming | |
| A | HZSM-5 | 34 | 19 | 44 |
| B | HZSM-5 Extrudate | 40 | 15 | 62 |
| C | 2% Zn ZSM-5 | 49 | 48 | 2 |
| D | 1% Zn 1% Cu ZSM-5 | 53 | 51 | 4 |
| E | 1.2% Zn Extrudate | 55 | 22 | 60 |
| F | 1% Zn 1% Cu Extrudate | 54 | 30 | 44 |

Catalysts A and B, without added metals, both showed significant loss in aromatics yield after steaming, indicating poor steam stability.

Catalyst E shows that the addition of Zn increases the yield of aromatics when compared to catalysts A and B. The metal added by physical mixing of solid particles does not improve the steam stability of the zeolite as evidenced by the significant loss of aromatics yield after steaming.

Catalysts C and D clearly show substantially improved steam stability. That is, they show very little loss in aromatics yield after steaming.

Catalyst F was prepared in a similar manner as catalyst D, however, the data show it was not as steam stable as catalyst D. This is because of the presence of the alumina binder material which absorbed the impregnation solution preventing adequate ion exchange of the zeolite.

In order to demonstrate that a metal exchanged zeolite is stable in an oxidizing atmosphere but substantially less stable in a reducing atmosphere due to loss of metal such as by elution, the following experiments were carried out:

A Zn-ZSM-5 crystalline zeolite catalyst (Catalyst G) was prepared by exchanging a HZSM-5 zeolite (binder free) with a solution of 0.5 N $ZnCl_2$/0.5 N $NH_4Cl$ (9 ml/1.5 ml/gm) at 190° F. for four hours and thereafter calcined overnight at 950° F. It contained 0.63 wt % Zn. The catalyst was further calcined for 16 hours at 1100°. n-Hexane was then passed over the catalyst at 0.38 WHSV and 1050° F. The conversion of n-Hexane was 100% and an aromatics yield of 51% was obtained. Thus, the catalyst is active and stable in an oxidized state. After on-stream conversion for 20 hours, and air regeneration, the regenerated catalyst gave only 45% of aromatics. Analysis of the catalyst for Zn indicated a loss of 50% of the zinc originally present in the catalyst. The loss in aromatics yield is attributed to the loss of volatile zinc metal in the reducing atmosphere (i.e., during hexane reaction). Thus, in order to avoid a loss in catalyst selectivity, the catalyst should be exposed relatively briefly to a reducing atmosphere, such as provided by a short contact time riser reactor or similar device. Furthermore, the catalyst should be frequently exposed to an oxidizing atmosphere to maintain the desired cationic sites. Such oxidizing contact may be provided in a fluid catalyst air regenerator system of the riser regenerator type, dense fluid catalyst bed type and combinations thereof or other suitable arrangement. That is, the dispersed phase above the dense fluid bed may be restricted to provide an upflowing dispersed phase operation to which additional oxygen containing gas may be added as required.

To demonstrate that a reducing atmosphere is damaging to the metal modified zeolite, a catalytic test cycle was developed comprising the following sequence of steps:

(a) Catalyst pretreatment with air at 1000° F. for 30 min. followed by helium flush of the oxygen treated catalyst.

(b) n-Hexane aromatization with the oxygen treated catalyst at 1 WHSV, 1050° F.

(c) Helium flush the aromatizing catalyst and air regenerate at 1000° F. for 30-60 min.

(d) Helium flush followed by addition of 30 cc/min. of hydrogen at 1200° F. for 16 hours.

(e) Helium flush, then effect n-Hexane aromatization at 1 WHSV and 1050° F.

A Zn exchanged ZSM-5 crystalline zeolite (Catalyst H) was prepared by impregnation of 1% Zn on a binder free $NH_4$ ZSM-5 as described in the preparation of Catalyst C.

Catalyst I is a binder free HZSM-5 prepared in the same manner as Catalyst A.

Results obtained in the test of these catalysts are shown in Table 2.

Table 2

| | Test Results | | |
|---|---|---|---|
| | Aromatics Yield | | Loss of Aromatics |
| | at Step (b) | at Step (e) | Yield |
| Catalyst H | 52.0 | 36.5 | 15.5 |
| Catalyst I | 27.1 | 26.7 | −0.4 |

Analysis of Zn in catalyst H after step (e) showed a loss of 45%. The significance of the test results are as follows:

(1) Metal modified ZSM-5 is superior to HZSM-5 as an aromatization catalyst as evidenced by the higher aromatics yield at step (b).

(2) Providing a reducing atmosphere as represented by steps (b), (d) and (e) immediately above is harmful to metal modified ZSM-5 as evidenced by the loss of aromatics yield. It is less harmful to a metal free ZSM-5 in the absence of steam.

The data obtained with catalysts A through F show that metal exchanged ZSM-5 crystalline zeolite (prepared by ion exchange or impregnation of ZSM-5 free of alumina binder) have improved steam stability.

In the conversion of oxygenates, such as lower alcohols to gasoline boiling product, the environment is more hostile to the catalyst because the reactions proceed not only in a reducing atmosphere, but also in the presence of steam. To test the stability of the catalysts under these conditions, an accelerated steam deactivation test using both water and n-Hexane as the feed was used. The presence of n-Hexane provides the reducing atmosphere desired for the test. The tests were carried out under the following conditions:

| Temperature | 900° F. |
|---|---|
| Pressure | 80 psig |
| Duration of Test | 16 hours |

Catalyst J was a HZSM-5 zeolite, catalyst K was a Cu containing ZSM-5 zeolite. After these catalysts were subjected to the accelerated steam deactivation test, the acid activity of the catalyst was determined by the prior art known standard alpha test. The alpha test comprises converting n-Hexane over the catalyst at a temperature of 1000° F.

In a separate experiment, catalyst K was subjected to the same accelerated steam deactivation test, except that oxygen was added in the form of hydrogen peroxide dissolved in the water. The oxygen concentration was estimated to be of about 3 vol. %. Results are shown in Table 3.

Table 3

| | Test Results | |
|---|---|---|
| Example | | Alpha |
| J | Catalyst J HZSM-5 | 23 |
| K | Catalyst K Cu ZSM-5 | 27 |
| L | Catalyst K Cu ZSM-5 + $O_2$ | 42 |

The significance of these results are as follows:

(1) Cu ZSM-5 when steamed under a reducing atmosphere which is equivalent to the condition for methanol conversion, loses much of the stabilization effect of Cu as evidenced by an alpha value of 27 similar to the base case of HZSM-5 (Catalyst J) with an alpha value of 23.

(2) In the presence of trace amount of oxygen, it is believed that Cu is maintained in its cationic state in zeolite ZSM-5, Cu-ZSM-5 has a much improved steam stability as evidenced by a high alpha value of 42 obtained after the steaming test.

The following examples illustrate the importance of short contact time reductive/oxidative (Redox) cycles to maintain catalyst activity at or above 900° F.:

A short contact time reactor was simulated by the use of a pulse reactor. A fixed bed of catalyst was used, and the residence time of the reactant was controlled by varying the flow rate of helium through the reactor. Methanol feed was injected into the reactor with a syringe as a pulse which was swept through the reactor by the helium, and the process was repeated. The products, were collected in a series of three refrigerated traps. The first was cooled with ice, the latter two with liquid nitrogen. The collected liquid was separated into an aqueous layer and an organic layer, and analyzed separately by gas chromatographic analysis. The gas was measured volumetrically and analyzed.

The results are illustrated by the use of two catalysts in two different modes of operation. The residence time is 1 sec. and the reaction temperature is 1000° F.

Example M used Catalyst A ($NH_4$ ZSM-5) as the catalyst, only pulses of methanol were fed.

Example N used Catalyst D (ZnCu ZSM-5) as the catalyst, only pulses of methanol were fed.

Example O used Catalyst A as the catalyst, alternate pulses of methanol and air were used.

Example P was completed in the same manner as Example O except Catalyst D is used.

The results on $C_4^+$ gasoline yield are shown in Table 4.

Table 4

| | Gasoline Yields from Short Contact Time Reactor | | |
|---|---|---|---|
| | | $C_{4+}$ Gasoline Yield | |
| Example | | Fresh | After 10g MeOH/g Cat | After Air Regeneration |
| M | (NH$_4$ ZSM-5) | 86 | 65 | 70 |
| N | (ZnCu ZSM-5) | 88 | 66 | 71 |
| O | (NH$_4$ ZSM-5) | 86 | 70 | 70 |
| P | (ZnCu ZSM-5) | 88 | 87 | 87 |

It is noted that only the metal exchanged ZSM-5 zeolite maintained in a pulsed oxidizing atmosphere has excellent stability at these temperatures. Furthermore, the short contact time reactor is not particularly beneficial to HZSM-5 (acid ZSM-5 zeolite) at these high temperatures, because HZSM-5 is subjected to irreversible steam deactivation during the methanol reaction when high temperature steam is produced.

We claim:

1. A method for stabilizing a crystalline zeolite conversion catalyst comprising metal cationic sites employed in a reducing atmosphere to effect chemical conversion of reactants to desired products which comprises, maintaining the crystalline zeolite conversion catalyst with metal cationic sites in a reducing chemical conversion atmosphere for a period of time less than that required to reduce and form metal clusters, and timely regenerating the catalyst in an oxygen atmosphere under conditions to restore and maintain distribution of metal cationic sites in said catalyst used in said chemical conversion.

2. The method of claim 1 wherein the stabilized crystalline zeolite has an alpha activity greater than 10.

3. The method of claim 1 wherein the crystalline zeolite catalyst is one selected from the group consisting of ZSM-5, ZSM-11, ZSM-12, ZSM-35, ZSM-38, faujasite, mordenite, and erionite.

4. The method of claim 1 wherein the chemical conversion activity of the catalyst is maintained by periodic exposure to an oxidative atmosphere prior to the catalyst cationic sites being reduced to a zero valence single atom state or to a zero valent metal state.

5. The method of claim 4 wherein the chemical conversion involves in situ formation of steam and oxidative regeneration is accomplished before the presence of steam will irreversibly deactivate the catalyst.

6. The method of claim 4 wherein the chemical conversion is accomplished in the presence of steam and a reducing atmosphere and exposure of the catalyst to an oxidizing atmosphere is accomplished in advance of obtaining incipient zero valent single atom state of metal cationic sites.

7. The method of claim 1 wherein the chemical conversion of reactants involves the conversion of lower alcohols to hydrocarbons.

8. The method of claim 1 wherein the exchanged metal cationic site comprises a metal selected from Groups IB, IIB and VIII of the Periodic Table except cobalt.

9. The method of claim 1 wherein the metal cationic site comprises zinc.

10. The method of claim 1 wherein the catalyst is periodically subjected to an oxidizing atmosphere at a temperature within the range of 750° F. to 1350° F. to maintain desired metal cationic sites.

11. The method of claim 1 wherein the chemical conversion involves the conversion of methanol to gasoline at a temperature within the range of 700° to 1100° F.

* * * * *